3,478,092
METHOD OF IMPROVING THE COLOR AND COLOR STABILITY OF BENZOIC ACID
Raymond W. Ingwalson, William F. Smith, and James O. Wright, Chattanooga, Tenn., assignors to Velsicol Chemical Corporation, Chicago, Ill., a corporation of Illinois
No Drawing. Continuation-in-part of application Ser. No. 287,217, June 12, 1963. This application Apr. 6, 1966, Ser. No. 540,519
Int. Cl. C07c 51/44
U.S. Cl. 260—525    9 Claims

ABSTRACT OF THE DISCLOSURE

Process for purifying benzoic acid by adding to molten benzoic acid a manganese compound and heating the mixture.

---

This application is a continuation-in-part application Ser. No. 287,217 filed June 12, 1963 and now abandoned.

The present invention relates to a method of improving the color and color stability of benzoic acid. More particularly, it is concerned with a process for the purification of benzoic acid prepared by conventional methods to render the benzoic acid essentially color free and color stable when stored indefinitely in the solid state or for extended periods in the liquid state.

Benzoic acid has utility as a preservative for other organic materials susceptible to bactericidal and fungicidal attack. Its esters have utility as plasticizers, synthetic lubricants and coating compositions. Benzoic acid is therefore a well known and versatile chemical which can be converted to a wide variety of other chemical compounds through reactions of the carboxyl group and aromatic ring.

To achieve wide scale usage in these and other applications, benzoic acid must be available in relatively pure form at low cost and must possess a high degree of stability so that it may be handled, stored and processed without deterioration. One of the more economical methods for the large scale production of benzoic acid involves the air-oxidation of toluene in the presence of a soluble metallic catalyst, such as manganese and cobalt salts. While the product obtained in this type of operation is largely benzoic acid, small amounts of many by-products are formed therewith, the products being extremely difficult to remove from benzoic acid by conventional means. Extensive analytical work on technical benzoic acid prepared by air oxidation of toluene, utilizing vapor phase chromatographic analysis and other methods, indicates the presence in commercial benzoic acid of more than thirty different compounds ranging from a few parts per million to tenths of one percent. The identity of many of these by-products has not been established. The presence of these impurities in small amounts contribute to color instability and off odors in the resultant benzoic acid.

In the large scale production of benzoic acid by catalytic oxidation of toluene with air, it has in the past been found desirable to purify the resultant benzoic acid by fractional distillation of the crude reaction product. In this way, benzoic acid, assaying over 99% purity, is readily produced. However, experience has shown that neither repeated distillation, nor the use of a distillation column of high theoretical efficiency, will produce a product which is stable with respect to color or odor, particularly when the product is stored in the molten state. When benzoic acid, of air oxidation of toluene origin and purified by conventional distillation followed by flaking, is stored as flakes in drums or sealed containers, it gradually develops a light brown color. Also, when the product is held in the molten state, over 122° C., it rapidly develops a yellow or brown color.

It is also significant to note that the color bodies in the benzoic acid carry over into reaction products produced therefrom, such as esters, imparting difficult purification problems to the reaction products. Hence, if either the large scale production of esters and other derivatives from benzoic acid or bulk transportation of benzoic acid is contemplated, it is highly desirable to utilize a product that does not appreciably darken when it is held in a molten state.

In the storing, handling and shipping of benzoic acid as a liquid, it may be subjected to elevated temperatures over the range of 122.4° C. to 200° C. or more with temperatures in the range of 130–160° C. being commonly encountered. Under these conditions benzoic acid of +99% purity, produced by distillation of toluene air oxidation mixtures, changes color from a practically colorless liquid to a dark brown material even when stored under an inert gas at temperatures of 130°–160° C. Repeated distillation improves this condition but does not eliminate it.

Heretofore, prior art methods directed at purifying and clarifying benzoic acid to an acceptable color have involved the use of potassium permanganate solution, either alone or in combination with other bleaching agents such as sodium hypochlorite. The bleaching solution is applied to benzoic acid, which is in the form of an aqueous solution of its sodium salt, or applied to free benzoic acid dissolved in water. Successive treatments of aqueous solutions of sodium benzoate with sodium hypochlorite bleach and potassium permanganate was in fact utilized by the German industry during and prior to World War II as disclosed by Intelligence reports. See, for example, "Process for the Preparation of Benzoic (By Air) from Toluene," I.G. Farbenindustrie, Technical Report No. 2361, Jan. 21, 1946, and "Benzoic Acid Manufacture in Germany," British Intelligence Objectives Subcommittee, B.I.O.S. Final Report No. 1786, Item No. 22 and supplement F. R. No. 66. As described therein, crude benzoic acid prepared by the catalytic liquid phase air oxidation of toluene was neutralized by aqueous sodium hydroxide to form water-soluble sodium benzoate. The solution was repeatedly steamed and bleached with sodium hypochlorite, treated with 1.7 to 5.1% by weight of potassium permanganate, steamed again, filtered, and neutralized with hydrochloric acid to liberate benzoic acid, centrifuged, washed until salt-free and dried. The final product is described as at least 99% in purity and slightly yellow in color.

More recently, British Patent 802,117 discloses a method similar to the above process whereby crude benzoic acid, also prepared by the catalytic air oxidation of toluene, was treated with the required volume of water at 98° C. A by-product brown oil layer was separated; the benzoic acid-containing solution was agitated near the boiling point and a 3% solution of potassium permanganate in water was added dropwise until a pink color remained for a few minutes. Activated carbon was then added; the solution was stirred and refluxed and then filtered and allowed to cool. The benzoic acid separated out as fine white crystals which assayed 99.9% as benzoic acid. This process, while simpler than the German method and capable of producing a white product of high purity, required also a number of time-consuming operations and involved the handling of large volumes of liquids. Indeed, over 17 parts of water per one part of benzoic acid was required for the recrystallization step. In addition, benzoic acid dissolved in the mother liquor was required to be recovered in a further step or discarded as a loss.

The prior art methods disclosed to date are therefore complex, cumbersome, time consuming, and costly in nature requiring a large volume of water as a solvent or carrying vehicle for both benzoic acid and the treating agents. Further, no prior art method has been disclosed which utilizes minimal quantities of treating agents in combination with a simple, direct, conventional distillation process.

It is therefore an object of the present invention to provide a method of purifying benzoic acid prepared by air oxidation of toluene to effectively render it essentially color-free and color-stable when stored in the solid, molten or liquid form.

It is a further object of the present invention to provide a process for treating molten benzoic acid prepared by air oxidation of toluene with an alkali or alkaline-earth permanganate or manganese dioxide in suitable form and subsequently isolating essentially color-free and color-stable benzoic acid by conventional distillation of the treated mixture.

The benzoic acid, purified according to the process of this invention, retains, substantially indefinitely, a bright white color when stored in the solid state. Of more importance is the fact that benzoic acid purified according to the process of this invention and stored in the liquid molten state retains a high degree of clarity and freedom from color for exended periods of time. Furthermore, benzoic acid purified as described herein is greately improved in odor relative to the untreated product.

One embodiment of this invention is found in a process whereby benzoic acid of variable purity is heated and agitated with minimal quantities of alkali or alkaline-earth permanganate or manganese dioxide in the molten state at temperatures above 115° C. and subsequently distilled in a simpler manner to yield a product which is essentially color free in the solid or molten state and retains a high degree of freedom from color substantially indefinitely when stored in the solid state, or for a very long period of time when stored in the molten state.

In the practice of oxidation of toluene with air or molecular oxygen-containing gases—temperatures, pressure catalysts, reaction time, solvents, and purity of original toluene can vary and these have a bearing on the purity of the resulting benzoic acid. Depending on the reaction conditions, a benzoic acid of above about 90% purity is usually obtained when the excess toluene or reaction solvent is removed. Under carefully controlled conditions, a product can be produced which assays 94-98% benzoic acid on distillation of the more volatile constituents, namely the excess toluene and co-product, benzaldehyde, from the crude air oxidation mixtures. Distillation of benzoic acid from the higher boiling residues permits obtaining a benzoic acid of above 99% assay.

Crystallization of crude air oxidation liquors, where excess toluene is used as a solvent or where aliphatic acid or acetic acid is used as a solvent, followed by washing and removing of the residual solvent, produces products assaying above 95% for benzoic acid. The benzoic acid thus produced is not color stable on prolonged heating.

If the toluene being oxidized contains any appreciable amount of xylene, then a benzoic acid of lower assay, 85%, contaminated with toluic and phthalic acids may be produced.

In general, we prefer to treat benzoic acid that contains less than 5% of non-acidic impurities and the highest quality product is obtained on treating material which contains less than 2% non-acidic impurities. Our treatment is also applicable to benzoic acid which assays over 99% purity and therefore would be satisfactory from a general purity standpoint but still contains a sufficient amount of latent color formers to render it unsatisfactory for molten storing and processing.

Briefly, we have found that treatment of molten benzoic acid derived from the air oxidation of toluene whereby in the major amount of unreacted toluene has been removed, the resultant benzoic acid assaying above 95% purity, with a manganese dioxide treating agent, such as alkaline-earth, alkali metal permanganates or manganese dioxide, followed by distillation of the treated acid, produces benzoic acid of improved color stability. The amount of treating agent and the time and temperature of treatment can be varied to fit the specific benzoic acid at hand as will be illustrated in examples that follow.

EXAMPLE I

Benzoic acid was prepared by passing air through a pressurized reactor containing toluene and 0.2% cobalt naphthenate dissolved therein, while the temperature of the solution was maintained at between 150° C. to 160° C. under a gauge pressure of 150 pounds per square inch. The vapors thus produced were passed through a condensor where the water of reaction was removed, as formed, by condensation and separation of this water layer from system, as the condensed toluene was continuously returned to the reaction zone. This oxidation was carried out until a sample of the reaction product analyzed about 40% benzoic acid.

The reaction mixture was then removed from the pressurized reactor placed in a still and subjected to distillation. The distillation was carried out through a packed column containing about 5 theoretical plates. Toluene was distilled from the product and a vacuum was applied to the still to maintain a pressure of 100 mm. Hg. Low boiling foreruns containing some benzaldehyde were removed until the distillate assayed 98.5% benzoic acid. At this point, collection of product was started. The distillation was continued at reduced pressure with periodic checks being made on the assay of the benzoic acid distillate. During the course of the distillation, the product, benzoic acid, gradually increased in purity going as high in assay as 99.8% benzoic and then dropping off in purity. When the purity of the product had declined to an assay of 99%, the distillation was discontinued. The resulting benzoic acid product fraction was of a very light color in the molten condition. It had a composite assay of 99.2 mole percent benzoic acid by freezing point.

Four portions of the distilled acid with a 99.2 mole percent assay were treated differently, as follows:

EXAMPLE II

No treatment.

EXAMPLE III

A sample of the benzoic acid of Example I was distilled through a 1 foot column packed with ⅛" glass helices at 100 mm. Hg pressure taking no forerun cut and recovering 97 weight percent of the acid charged.

EXAMPLE IV

A kilogram sample of the benzoic acid of Example I was heated to 130° C. and 6 grams of solid potassium permanganate was slowly added thereto while agitating the sample. The potassium permanganate dissolved giving a deep purple solution. The temperature of the benzoic acid and potassium permanganate mixture was then brought to 170° C. in a period of thirty minutes and this temperature was maintained for a period of four hours. At the end of this period most of the purple color had been dissipated. The mixture was then charged to the same distillation apparatus used in Example III above and distilled in the same manner recovering 97.2% of the original material.

EXAMPLE V

Another kilogram sample of the benzoic acid of Example I was heated to 170° C. and 5 grams of powdered manganese dioxide was commingled therewith. This mixture was slowly agitated at 170° C. for 18 hours. At the end of this period the molten product was charged to the same type of distillation equipment used in Examples III and IV and distilled in the same manner to obtain a 97.3% recovery of benzoic acid.

Of the above examples, Examples II and III represent prior art treatment, while Examples IV and V are examples of the present process.

A portion of each of the materials of Examples II, III, IV and V were solidified by flaking and stored in closed glass containers for 4 weeks in the dark at 250° C. Initially all products appeared as white flakes. After the storage period, flaked products from the products of Example II and Example III had a definite yellow appearance while the flaked products from the products of Examples IV and V had the same white color as when initially placed in the bottles for storage.

Other portions of the materials of Examples II, III, IV and V were placed in other glass containers and labeled samples a, b, c and d respectively. Color determinations were made immediately on each of these molten samples. The molten samples were then stored at 150° C. for color development observations. Color measurements were made on the samples, stored in the liquid state at 150° C., by comparing the molten acids with APHA* color standards as follows:

TABLE I

| Sample | Color after storage at 150° C. for— | | | | | |
|---|---|---|---|---|---|---|
| | 0 hrs. | 24 hrs. | 48 hrs. | 72 hrs. | 96 hrs. | 168 hrs. |
| (a) | 30 | 350 | +500 | | | |
| (b) | 25 | 275 | +500 | | | |
| (c) | 20 | 30 | 30 | 30 | 30 | 35 |
| (d) | 25 | 35 | 35 | 35 | 40— | 45 |

In addition to improved color stability, the treated samples c and d did not have the rather sharp offensive odor present in samples a and b normally associated with benzoic acid manufactured by oxidation of toluene with molecular oxygen. The benzoic acid that was treated, c and d, had an assay of 99.3 mol percent benzoic acid by freezing point.

EXAMPLE VI 1600 grams of crude benzoic acid, assaying 94.4 percent benzoic acid, which had been produced by the oxidation of toluene with air at 160° C. and 150 p.s.i. in the presence of cobalt naphthenate catalyst and stripped of unreacted toluene and more volatile intermediates, was charged into a two liter glass flask. 32 grams of manganese dioxide was added and the mixture was heated to 170° C., then agitated for four hours. After the four hour treatment at 170° C., the agitator was replaced by a 25 mm. column, two feet tall, packed with ⅛ inch glass helices, plus a distillation head and distillate receiver. Two distillate fractions were taken over with no reflux except for some condensation caused by heat losses, at a pressure of 100 mm.

A second portion of the same crude acid, 1600 grams, was treated with KMnO₄. Here the KMnO₄, 64 grams, was added slowly to the molten acid with agitation over a temperature range of 130–155° C. in a period of thirty minutes. The material was agitated at 160°–170° C. for a period of 8 hours. At the end of the treatment period, the mixture was charged to the same distillation apparatus and distilled in the same manner as described above.

The following Table II summarizes the results obtained on the treated and distilled products and equivalent product which was distilled under identical conditions without treatment.

TABLE II

| Treatment | Distillation fraction | Percent of charge | Assay, Percent | Color (APHA) | | |
|---|---|---|---|---|---|---|
| | | | | | After Storage 150° C. | |
| | | | | Initial | 24 hrs. | 48 hrs. |
| MnO₂: | | | | | | |
| Treated and distilled | 1 | 43.4 | 98.2 | 20 | 200 | 300 |
| | 2 | 44.4 | 99.7 | 20 | 100 | 150 |
| Distilled only | 1 | 43.5 | 98.0 | 20 | 300 | 500 |
| | 2 | 48.5 | 99.6 | 20 | 500 | >500 |
| KMnO₄: Treated and distilled | 1 | 43.5 | 98.5 | 20 | 150 | 225 |
| | 2 | 40.0 | 99.5 | 20 | 75 | 100 |

The above Examples IV, V an VI illustrate the preparation of a benzoic acid of excellent color stability which can be satisfactorily stored and shipped in the molten state. In the purification of benzoic acid that is to be held molten for shorter periods of time, color stability requirements may not be as stringent. The use of our treating agents on molten benzoic acid of varying degree of purity, that is, not heat stable has shown improvement in heat stability in all cases.

It will be understood by those skilled in the art that, because of variation in the nature of color forming bodies present and varying content of same in different benzoic acids, one practicing this invention should, for best results, set up a series of tests involving the particular acid to be treated. These tests preferably should cover the use of increments of the permanganates or manganese dioxide over the range of 0.05 to 5% by weight, temperatures that will maintain the product in the molten state usually in the range of 115° to 200° C. and treating times in the range of 0.5 to 24 hours. On distilling the resulting acid one can ascertain more accurately the optimum amount of treating agent, time and temperature required for the desired color stability. If the amount of treating agent required to produce the desired heat stability appears in excess of practical limits, one may further refine the acid that is to be treated by further fractional distillation or crystallization prior to treatment and distillation.

The permanganate—sodium, lithium, calcium, magnesium and barium—may be used according to the present invention in place of the potassium permanganate of Example IV and may be added to the benzoic acid as a solid or as an aqueous solution. When added as an aqueous solution, we prefer to use a permanganate concentration that will not dilute the benzoic below about 90% assay. The manganese dioxide can be added as a solid and both natural and synthetic manganese dioxides are workable in the practice of the invention.

The amount of manganese dioxide agent to be used in the present process will depend on various factors including the purity of the benzoic acid, the identity of the impurities, identity of the manganese dioxide agent being used and the precise process conditions. The manganese dioxide agent has been found to be effective in amounts from about 0.01 to about 10% by weight of the benzoic acid product being purified.

Depending on the nature of the benzoic acid being treated, we prefer to use less than 5% by weight, of the manganese dioxide treating agent, since excessive amounts can produce high still pot residues. In most cases where a benzoic acid of above 98% assay is being treated, less than 1% of treating agent is satisfactory. In some acids that assay over 99.0% as benzoic, we have found as little as 0.01 to 0.1% treating agent to give an improved

---

*APHA refers to the color standards defined in *Standard Methods for the Examination of Water and Sewage*, American Public Health Association, Ninth Edition, 1946, page 14.

heat stable product. This depends on the nature of impurities present.

The time required for treatment varies with temperature, acid being treated and treating agent. We have found treating times, i.e. the time in which the benzoic acid and treating agent are held in admixture prior to distillation, of as short a duration as 15 minutes to effect color improvement while times as long as 48 hours may be required depending on other factors. In general, we prefer to use a treating time of 1 to 24 hours.

Treatment temperature has a direct effect on the reaction time required. We prefer to use treating temperatures in the range of 130 to 190° for practical considerations such as heat economy and process simplicity. However, temperatures between the 115° C. and boiling point of benzoic acid (250° C.) have been found to be effective. At these extremes solidification and excessive vapors add to operational problems.

Where higher temperatures are used for treatment and permanganate is the treating agent, we prefer to start the treatment at lower temperatures followed by a gradual rise in temperature to avoid excessively fast reaction and the possible hazards of a violent reaction. Manganese dioxide can be safely added at higher temperatures.

The following Table III illustrates the improvement in color stability of molten benzoic acid when treated according to our invention. Benzoic acids of different degrees of purity that have been made by variations of the air oxidation of toluene procedure have been tested. Also variations of treating agent, amount of treating agent, time of treatment and temperature of treatment are illustrated. In these color stability comparisons both treated and untreated product were distilled through a short, relatively inefficient column using the same distillation technique in each case.

hydroxide. The aqueous sodium benzoate was separated from the hydrocarbon layer and made acid with sulfuric acid. The cooled benzoic acid slurry was filtered, washed with water, dried and distilled to produce a benzoic acid of 99.3% assay for this treatment.

Origin 4 benzoic acid was produced by the air oxidation of toluene using a manganese naphthenate as catalyst and the crude acid purified to 98.9% assay by distillation.

Origin 5 benzoic acid was produced by the oxidation of toluene using acetic acid as a solvent at temperatures of 150 to 165° C. and using about 1% of equal weights of cobalt acetate and manganese bromide as catalyst. The resulting benzoic was crystallized two times from acetic acid and the acetic removed by evaporation to produce the 97.8% assay product for treatments shown in the table.

The above table is illustrative of the scope of our invention and the manner in which it can be carried out. Essentially, it involves the simple steps of heating molten benzoic acid with a permanganate or manganese dioxide followed by a relatively simple distillation to produce a benzoic acid of improved color stability on prolonged storage in the molten condition.

On of the features of the present invention is that it employs a substantially dry system, i.e. a system that does not contain sufficient water to dissolve the benzoic acid. This eliminates a significant disadvantage of prior procedures requiring large volumes of water and the corresponding large pieces of equipment.

During the present process there can be formed relatively small amounts of water. Also in incorporating the manganese dioxide agent into the system, water can enter into the system. This water will be relatively insignificant as to the solubility of the benzoic acid and will not affect

TABLE III

| Test | Origin of acid | Assay prior to treatment | Treating agent | Percent treating agent | Treating temperature, C. | Treating time, hrs. | Color of acid after 150° C. aging for 48 hours | |
|---|---|---|---|---|---|---|---|---|
| | | | | | | | Without treatment (APHA) | With treatment (APHA) |
| (e) | 1 | 99.9 | $KMnO_4$ | 0.1 | 160 | 10 | 200 | 30 |
| (f) | 1 | 99.9 | $MnO_2$ | 0.1 | 160–180 | 20 | 200 | 35 |
| (g) | 1 | 99.9 | $NaMnO_4 \cdot 3H_2O$ | 0.1 | 160 | 10 | 200 | 35 |
| (h) | 1 | 98.8 | $Ca(MnO_4)_2 \cdot 4H_2O$ | 0.7 | 150 | 20 | 500 | 25 |
| (i) | 1 | 98.8 | $Ba(MnO_4)_2$ | 0.7 | 150 | 24 | 500 | 30 |
| (j) | 1 | 98.8 | $Mg(MnO_4)_2 \cdot 6H_2O$ | 0.7 | 160 | 20 | 500 | 30 |
| (k) | 1 | 98.8 | $MnO_2$ | 0.75 | 170 | 10 | 500 | 25 |
| (l) | 1 | 98.8 | $MnO_2$ | 1.0 | 175 | 4 | 500 | 35 |
| (m) | 1 | 98.8 | $MnO_2$ | 1.0 | 195 | 2 | 500 | 30 |
| (n) | 1 | 98.8 | $KMnO_4$ | 0.75 | 130 | 24 | 500 | 35 |
| (o) | 1 | 98.8 | $KMnO_4$ | 1.5 | 120 | 48 | 500 | 30 |
| (p) | 1 | 98.8 | $MnO_2$ | 1.0 | 125 | 24 | 500 | 30 |
| (q) | 1 | 96.0 | $MnO_2$ | 3.5 | 150 | 24 | +500 | 200 |
| (r) | 1 | 96.0 | $KMnO_4$ | 3.5 | 150 | 24 | +500 | 180 |
| (s) | 1 | 94.3 | $KMnO_4$ | 4.5 | 150 | 24 | +500 | 350 |
| (t) | 2 | 91.0 | $KMnO_4$ | 1.5 | 160 | 24 | +500 | 300 |
| (u) | 2 | 91 | $MnO_2$ | 1.5 | 170 | 24 | +500 | 275 |
| (v) | 3 | 99.3 | $MnO_2$ | 1.00 | 175 | 18 | 350 | 50 |
| (w) | 3 | 99.3 | $KMnO_4$ | 1.00 | 165 | 12 | 350 | 40 |
| (x) | 4 | 98.9 | $KMnO_4$ | 0.75 | 160 | 12 | 300 | 30 |
| (y) | 4 | 98.9 | $MnO_2$ | 0.50 | 170 | 20 | 300 | 30 |
| (z) | 4 | 98.9 | $NaMnO_4$ | 0.35 | 170 | 12 | 300 | 45 |
| (aa) | 5 | 97.8 | $KMnO_4$ | 1.0 | 170 | 12 | 250 | 30 |
| (ab) | 5 | 97.8 | $MnO_2$ | 1.0 | 160 | 24 | 250 | 35 |

Origin 1 benzoic acid in the above table W as prepared in a manner similar to the material of Example I.

Test (o) involved the introduction of aqueous potassium permanganate into benzoic acid of Origin 1 having a 98.8% asay prior to the addition of water with the permanganate. The benzoic acid assay after addition of the aqueous permanganate was about 92%.

Origin 2 benzoic acid was made from toluene that contained xylene in a process similar to that of Example 1 and contained several percent of toluic and some phthalic as impurity. Non- acidic impurities in this material amounted to less than 1%.

Origin 3 benzoic acid was recovered from the toluene oxidation mass as used in Example 1 by treating the warm toluene solution of benzoic with 10% aqueous sodium the fact that the process is performed in a substantially dry or nonaqueous system.

Furthermore by performing the present process at substantially atmospheric pressure the water, if any is present in the system, will be removed due to the temperature used in the process. Thus this process in essence utilizes a substantially nonaqueous or dry system having the aforesaid advantages.

In the course of our experimental work we have tried many treating agents on molten benzoic acid but have found none that are as effective as the alkali metal and alkaline-earth permanganates and manganese dioxide. These treating agents that have been tested have been taken from the materials that are generally considered condensing agents, oxidizing agents and reducing agents.

These have involved treating molten benzoic acid with minor amounts of zinc oxide, sulfuric acid, sodium acid sulfate, aluminum isopropylate, zinc chloride, magnesium oxide, calcium oxide, sodium benzoate, zinc dust, oxalic acid, calcium hypochlorite, benzoyl peroxide, sodium peroxide, sodium hydrosulphite, potassium hydroxide, oxygen and cobalt benzoate, nitric acid, sodium borohydride, potassium dichromate, and manganous benzoate. Although some of these treatments show improvements in color stability, none is comparable to the effectiveness of manganese dioxide or the above mentioned permanganates.

Prolonged heating of benzoic acid in various degrees of purity at temperatures in the range of 150–200° C. followed by distillation gives some improvement in heat-color stability. Again this procedure has not been found as effective or as efficient as the use of permanganates or manganese dioxide for shorter periods of time. These treatments of our invention may be used to improve thermally treated acid.

Molten benzoic acid of the same origin as used for the manganese dioxide and permanganate treatment in Example I has been passed through beds of activated carbon. Again some improvement in heat stability was obtained but this treatment was not comparable to the manganese dioxide or permanganate treatments. Treatment according to our invention improves the heat-color stability of benzoic acid that has been treated with activated carbon.

We claim:

1. A process of purifying benzoic acid prepared by the air oxidation of toluene to improve its color and color stability which comprises heating said benzoir acid to a molten state, adding a manganese compound selected from the group consisting of manganese dioxide, alkali permanganates and alkaline earth permanganates, maintaining the temperature of the mixture between about 130° C. and 190° C. for a time of between about 15 minutes and about 48 hours, the said process being carried out in a substantially dry system and distilling the benzoic acid from the mixture.

2. The process of claim 1 wherein the manganese dioxide agent is manganese dioxide.

3. The process of claim 1 wherein the manganese dioxide agent is an alkali permanganate.

4. The process of claim 1 wherein the manganese dioxide agent is an alkaline earth permanganate.

5. The process of claim 1 wherein the manganese dioxide agent is potassium permanganate.

6. The process of claim 1 wherein the heating is performed for a time of between about 15 minutes and about 48 hours.

7. The process of claim 1 wherein the pressure is maintained at about atmospheric pressure.

8. The process of claim 1 wherein the manganese dioxide agent is present in an amount of from about 0.01 to about 10% of the benzoic acid product of the air oxidation of toluene.

9. The process of claim 1 wherein the product of the oxidation of toluene contains a minimum of about 90% benzoic acid.

References Cited

UNITED STATES PATENTS

| | | | |
|---|---|---|---|
| 2,899,466 | 8/1959 | O'Neill | 260—525 |
| 2,963,509 | 12/1960 | Barker et al. | 260—524 |

FOREIGN PATENTS 802,117  10/1958  Great Britain.

BERNARD HELFIN, Primary Examiner

UNITED STATES PATENT OFFICE
CERTIFICATE OF CORRECTION

Patent No. 3,478,092          Dated November 11, 1969

Inventor(s) Raymond W. Ingwalson, William F. Smith and James O. Wright.

It is certified that error appears in the above-identified patent and that said Letters Patent are hereby corrected as shown below:

Col. 3, line 27, "exended" should read --extended--.

Col. 4, line 50, insert --glass-- after "foot";
       line 63, "purpose" should read --purple--.

Col. 5, line 22, "250° C" should read --25° C--.

Col. 7, line 61, "Was" should read --was--.

Col. 8, line 24, "On" should read --One--.

Claim 1, line 3, "benzoir" should read --benzoic--.

SIGNED AND
SEALED
JUL 21 1970

(SEAL)
Attest:

Edward M. Fletcher, Jr.
Attesting Officer

WILLIAM E. SCHUYLER, JR.
Commissioner of Patents